United States Patent [19]

Takahashi et al.

[11] 3,919,611

[45] Nov. 11, 1975

[54] BRAKING DEVICE FOR A SMALL DC MOTOR

[75] Inventors: Tadashi Takahashi; Kazuo Onishi, both of Hitachi, Japan

[73] Assignee: Hitachi, Ltd., Japan

[22] Filed: Dec. 7, 1973

[21] Appl. No.: 422,723

[30] Foreign Application Priority Data
Dec. 11, 1972  Japan.............................. 47-123329

[52] U.S. Cl. ................................................ 318/380
[51] Int. Cl.[2].......................................... H02P 3/12
[58] Field of Search........................... 318/379, 380

[56] References Cited
UNITED STATES PATENTS

| | | | |
|---|---|---|---|
| 2,965,827 | 12/1960 | Hohne, Jr. | 318/380 |
| 3,440,511 | 4/1969 | Igarashi et al. | 318/380 X |
| 3,582,747 | 6/1971 | Kearns | 318/379 |
| 3,781,617 | 12/1973 | Thomas | 318/380 X |

*Primary Examiner*—Robert K. Schaefer
*Assistant Examiner*—W. E. Duncanson, Jr.
*Attorney, Agent, or Firm*—Craig & Antonelli

[57] ABSTRACT

A small DC motor has its terminals connected to the collector and emitter of a transistor, respectively, to reduce the time required for stopping the revolution of the motor, and the transistor is rendered conductive by a counter electromotive force of the motor. The counter electromotive force generated by rotation of the motor due to inertia thereof upon interruption of a motor driving power supply causes the transistor to be made conductive and a short-circuit current to flow therethrough with the result of generation of a braking force.

8 Claims, 4 Drawing Figures

BRAKING DEVICE FOR A SMALL DC MOTOR

BACKGROUND OF THE INVENTION

1. Field of the Invention

The present invention relates to a braking device adapted for use in a small D.C. motor.

2. Description of the Prior Art

Recently, small D.C. motors have been in wide use in the fields of informational industries. For such use, it is desirable that the rotation of the motor stops immediately when a power supply is turned off. For this purpose there has been proposed a braking system in which a mechanical braking is provided with the aid of friction or another braking system in which the electric motor is short-circuited at the same time when a changing over switch turns off the power supply. However, the system using mechanical operations encounters the problems of durability. Further, the changing-over of the mechanical switch results in generation of noises, which are undesirable particularly for use in information processors, measuring devices or the like.

SUMMARY OF THE INVENTION

An object of the present invention is to provide a device for automatically generating a braking force in an electric motor when a power supply switch is turned off.

Other objects will be understood when reading the following description.

According to the present invention, between terminals of a D.C. motor there is connected a transistor having its base connected and reverse-biased by means of a power supply for driving the electric motor. The cutting-off of the power supply voltage causes the transistor to be biased in a forward direction by a counter electromotive force generated in the electric motor, thus rendering the transistor conductive. A short-circuit current or a current having a large level flows through the transistor and the electric motor, thereby generating the braking force in the electric motor.

DESCRIPTION OF PREFERRED EMBODIMENTS

Figure 1:
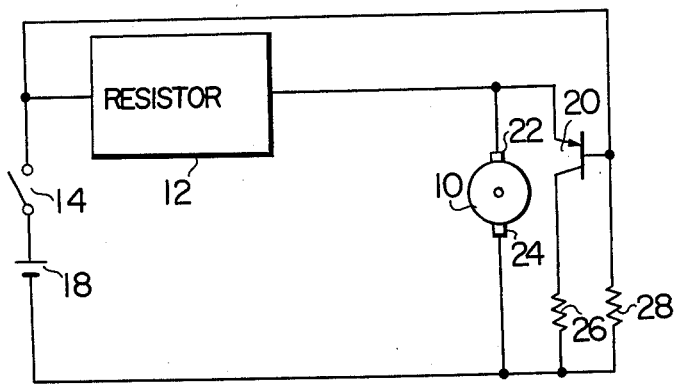
FIG. 1 is a circuit diagram showing a small D.C. motor circuit for general use including a braking device according to the present invention.

In FIG. 1, a D.C. motor 10 is connected to a D.C. power supply 18 through a resistor 12 and a switch 14. The resistor 12 may be of a usual type or may be replaced by a controlling device for the motor as the case may be. A transistor 20 is connected between both terminals 22 and 24 of the motor through a resistor 26. The transistor 20 has its base connected to a positive terminal of the D.C. power supply through the switch 14 and further connected to the negative terminal thereof through a resistor 28.

The turning-on of the switch 14 causes the voltage from the D.C. power supply 18 to be applied to the terminals of the motor 10 through the resistor 12 so that the terminals 22 and 24 may be positive and negative, respectively. This causes the motor 10 to initiate rotation. In this case, the level of a voltage drop between the emitter of the transistor 20 and the D.C. power supply 18 exceeds that of the voltage drop between the base of the transistor 20 and the D.C. power supply 18, thus forming a reverse bias between the base and emitter of the transistor 20 with the transistor turned off. As a result, the transistor 20 gives no influence upon the motor 10 when the switch is in the ON-state.

It is to be noted that the consumed power slightly increases because the circuit including the resistor 28 is connected in parallel with the motor circuit. The resistor 28 serves to flow a base current through the transistor 20 and thus has a high resistance, so that the power consumed in the resistor 28 is of a negligible order.

The opening of the switch 14 causes only the counter electromotive force, that is, a voltage generated due to inertia of the motor, to appear between the terminals 22 and 24 of the motor. This voltage causes the base-emitter path of the transistor 20 to be biased in the forward direction with the terminal 22 being positive and the terminal 24 negative. In this case, the base current is determined by the voltage between the terminals of the motor and the resistance of the resistor 28. The base current permits the collector current to flow through the resistor 26, thus generating the braking force in the motor 10. The large base current results in saturated current to the collector and the small base current leads to the non-saturated current to the collector. The resistor 26 serves to limit the collector current and to prevent the transistor 20 and the motor 10 from being broken as the motor has a greater rating because the large short-circuit current would otherwise flow due to the great counter electromotive force and small internal resistance. In the case of a small electric motor, the motor together with its associated transistor 20 never suffers from any damage even without the resistor 26.

In the present invention, by way of an example, a PNP transistor is used as a braking transistor. The present invention is not restricted to the use of such PNP transistor but an NPN transistor may be used with quite the same effects. In the latter, the electrical connection is opposite in polarity, and, for example, the D.C. power supply 18 is required to be opposite in polarity.

As mentioned earlier, the resistor 12 may be replaced with another circuit which may contain means for generating another voltage or active elements, if desired, under the following condition: the positive terminal of the D.C. power supply should be greater in potential than the terminal 22 in the normal operation of the motor.

Figure 2:
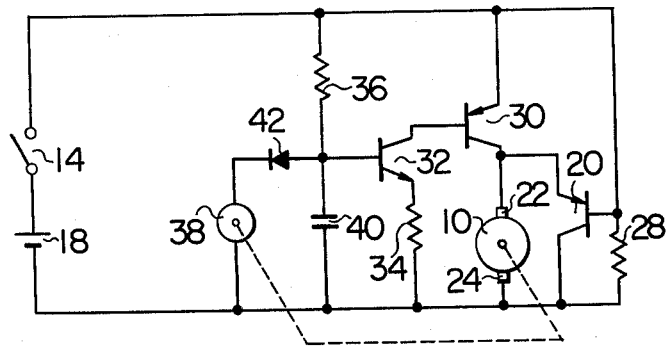
FIG. 2 is a circuit diagram showing an embodiment of the present invention including a D.C. motor circuit having a speed controller.

In FIG. 2, the motor 10 is connected to the D.C. power supply 18 through a transistor 30 and the switch 14. Between the terminals of the motor 10 there is connected the braking transistor 20, having its base connected to the collector through the resistor 28. A transistor 32 serves to amplify the base current of a transistor 30 and is connected to have its base connected to the positive terminal of the D.C. power supply 18 through a resistor 36 and its emitter connected to the negative terminal thereof through a resistor 34. A capacitor 40 is connected between the base of the transistor 32 and the D.C. power supply. An A.C. generator 38 for detecting a motor speed is provided between both the terminals of the capacitor 40 through a rectifier 42.

The closing of the switch 14 causes the base current to flow along the base-emitter path of the transistor 32 through the resistors 36 and 34, thus rendering the transistor 32 and hence the transistor 30 conductive. Accordingly, the motor 10 initiates to rotate.

The A.C. generator 38 for detecting the motor speed, in mechanical connection with the motor 10, generates a voltage corresponding to the speed of rotation of the motor 10, which voltage is stored on the capacitor 40 through the rectifier 42. The rectifier 42 is connected to apply to the capacitor such a voltage as bias the base of the transistor 32 to be negative and the negative terminal of the D.C. power supply 18 to be positive. Accordingly, the potential at the base of the transistor 32 is reduced as the speed of rotation of the motor 10 increases, and is substantially equal to the potential at the emitter thereof when the speed of rotation reaches a predetermined level. The transistor 32 then decreases in the collector current or is rendered to be non-conductive, and hence the transistor 30 also decreases in the collector current or is rendered to be non-conductive. When, on the other hand, the speed of rotation of the motor becomes lower than the predetermined speed of rotation, the transistor 30 increases in collector current. The repetition of these operations makes it possible to continue the rotation of the motor 10 at a constant speed.

In the ON state of the switch 14, the braking transistor 20 is always in an OFF state because it is reverse-biased. In other words, the base of the transistor 20 is kept substantially at the potential of the positive terminal of the D.C. power supply while the emitter of the transistor 20 remains at the potential reduced by an amount of the voltage across the emitter and collector of the transistor 30. Consequently, the base-emitter path of the transistor 20 is reversely biased and the transistor 20 is in the OFF state.

Next, the opening of the power supply switch 14 causes any voltage not to be applied to the transistor 30, thus generating between the terminals 22 and 24 of the motor 10 a voltage produced by rotation of the motor due to the inertia thereof. In this state, the emitter of the transistor 20 is greater in potential than the base thereof, so that the collector current is produced in the transistor 20 with the result of generation of the braking force in the motor 10.

Actual measurements in the circuit of FIG. 2 are shown in Table 1.

Table 1

| Braking circuit | Period of time required for stoppage of motor from switching off (sec.) | Resistance of resistor 28 (ohm) |
|---|---|---|
| Not provided | 0.4 | |
| Provided | 0.275 | 100 |
| Provided | 0.225 | 50 |

The actual measurements shown in Table 1 were conducted under conditions that the voltage of the power supply 18 is 6 volts, the torque of the motor is 6 gram-centimeters and the number of rotation of the motor is 2200 r.p.m.

Figure 3:
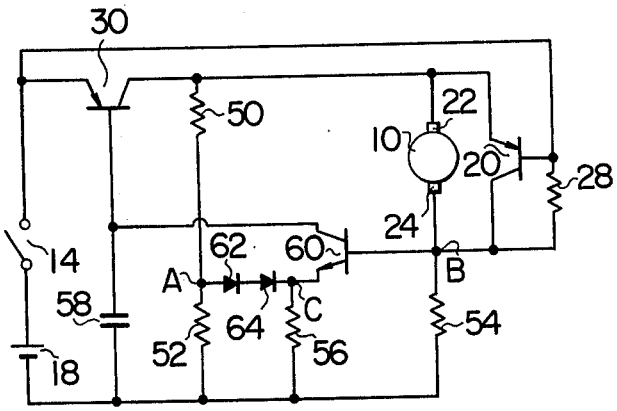
FIG. 3 is a circuit diagram showing another embodiment of the present invention including a D.C. motor circuit having a speed controller of another type.

FIG. 3 shows a circuit diagram in which a speed controller different from that shown in FIG. 2 is employed. The D.C. motor 10 is connected to the D.C. power supply 18 through the transistor 30 and the switch 14. Between the terminals 22 and 24 of the motor 10 there is connected the transistor 20, the base of which is connected to the collector thereof through the resistor 28. The motor 10, and resistors 50, 52 and 54 constitute a bridge circuit. Assuming that the resistances of the motor and these resistors are $R_{10}$, $R_{50}$, $R_{52}$ and $R_{54}$, respectively, then the bridge circuit is formed so as to have a relation, $R_{50} \cdot R_{54} = R_{10} \cdot R_{52}$. Under this condition, the voltage between points A and B is equal to the counter electromotive force of the motor 10 irrespective of the voltage of the power supply. Between the points A and B there is provided diodes 62 and 64 and a transistor 60 having its base connected to the base of the transistor 30. A capacitor 58 is connected between the transistor 30 and the negative terminal of the D.C. power supply 18. A resistor 56 is connected between the negative terminal of the D.C. power supply 18 and a point C connecting the emitter of the transistor 60 with the two diodes 62 and 64.

The closing of the switch 14 causes the base current to flow in the transistor 30 through the capacitor 58 whereupon the saturated collector current flows from the transistor 30 through the resistor 54 to the motor 10. The initiation of rotation of the motor 10 causes a counter electromotive force to be generated between the terminals 22 and 24 corresponding to the number of rotation and causes the voltage corresponding to the counter electromotive force to be generated between the points A and B. That is, the point A is kept at higher potential than the point B as the counter electromotive force of the motor 10 increases. In a state of a small potential difference between the points A and B, the base current flowing from the base of the transistor 60 to the point C is great, but reduced when the potential difference between the points A and B exceeds a predetermined level because the current flowing from the series circuit of the diodes 62 and 64 increases. This operation permits the base current of the transistor 30 to be controlled by the transistor 60 so as to keep the rotation of the motor 10 constant.

The opening of the switch 14 causes the emitter of the transistor 20 to be at higher potential than the base thereof because the voltage applied between the collector and emitter of the transistor 20 amounts only to the counter electromotive force of the motor 10, thus rendering the transistor 20 conductive. A great current equal to the short circuit current flows across the terminals 22, 24 of the motor 10, resulting in the generation of the braking force in the motor 10.

Figure 4:
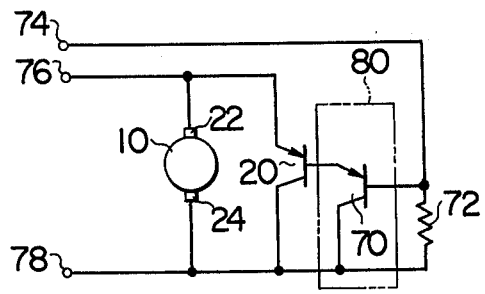
FIG. 4 is a circuit diagram showing a modification of the braking devices shown in FIGS. 1 to 3.

FIG. 4 shows an embodiment of the present invention in which means for amplifying the base current of the transistor 20 is provided for reducing the current flowing through the resistor 28 in the braking circuit shown in FIGS. 1 to 3. The terminals 22 and 24 of the motor 10 are connected to a D.C. power supply through terminals 75 and 78 similarly to FIGS. 1 to 3. The base of an amplifying transistor 70 is also connected to the D.C. power supply through a terminal 74. A resistor 72 is connected between the base and emitter of the transistor 70. When the motor 10 is driven by the D.C. power supply, the voltage drop between the terminal 76 and the D.C. power supply is set to be greater than that between the terminal 74 and the D.C. power supply. The base-emitter paths of the transistors 70 and 20 are reversed-biased, respectively, with the transistors 20 and 70 kept non-conductive.

The opening of a power supply switch similar to the switch 14 causes only a counter electromotive force to appear between the terminals 22 and 24 of the motor 10 with the terminal 22 positive and the terminal 24 negative. No voltage from the power supply is applied to the terminals 74 and 76, so that the base of the transistor 70 is reduced through the resistor 72 in potential to be lower than the base of the transistor 20 which also serves as the emitter of the transistor 70, with the result of the transistors 70 and 20 being rendered conductive. The base current of the transistor 20 is equal substantially to the base current of the transistor 70 multiplied by an amplification factor of the transistor 70. Thus, this permits the resistance of the resistor 72 to be increased up to a value of the resistance of the resistors 28 of FIGS. 1 to 3 multiplied by the amplification factor of the transistor 70. The resistor 72 (resistors 28 in FIGS. 1 to 3) is connected between the terminals of the D.C. power supply, which therefore is one of power consuming members at the driving of the motor. It is desirable to make the resistance value of the resistor 72 large in order to suppress the power consumption of this resistor. It is, accordingly, desirable to provide a circuit 80 for amplifying the base current of the transistor 20. When the rotation of the motor 10 is lowered by the short circuit current flowing through the transistor in the embodiments of FIGS. 1 to 3, the voltage between the terminals 22 and 24 decreases to an extent that the base current of the transistor 20 decreases, so that the collector current of the transistor cannot be saturated with the braking effect reduced. It will be appreciated that the circuit of FIG. 4 has a function to suppress the reduction of the braking effect.

Although in FIG. 4 the base-current amplifying circuit consists of the transistor connected in the Darlington configuration with the braking transistor, the amplifying circuit may be of an other suitable type with sufficient effect.

The present invention is very suitable for use in the motor having a high revolution while the braking system using the mechanical friction is remarkable for use in the motor having a low revolution, so that it will be appreciated that the present invention will be effectively improved in combination with the braking system using the mechanical friction.

We claim:

1. A braking device for a D.C. motor comprising
a D.C. power supply for said D.C. motor;
switching means for controlling said D.C. power supply, said switching means enabling said D.C. power supply to supply power to said D.C. motor when said switching means is in its closed position and disabling said D.C. power supply when said switching means is in its open position;
a first transistor having an emitter, collector and base, said emitter being connected to one terminal of said D.C. motor and said collector being connected to the other terminal of said D.C. motor;
a first resistor connected between said base and said collector of said first transistor;
a second transistor having an emitter, collector and base, said collector of said second transistor being connected to said one terminal of said D.C. motor, and said emitter of said second transistor being connected to said base of said first transistor and to one terminal of said switching means, so that said first transistor is reverse biased when said switching means is in its said closed position and automatically acts to brake said D.C. motor when said switching means is in its said open position; and
speed detector means, responsive to the rotational speed of said D.C. motor, for supplying the base current of said second transistor in proportion to said rotational speed, whereby said power supplied to said D.C. motor is varied to keep said rotational speed constant when said switching means is in its said closed position.

2. a braking device as claimed in claim 1, wherein said the speed detecting the comprises an A.C generator mechanically coupled to the axis of said motor, rectifying means for rectifying an output from said generator and a smoothing capacitor for storing the rectified output, a voltage across said capacitor being adapted to cause the base current of said second transistor to be varied.

3. A braking device as claimed in claim 2, further including a third transistor having an emitter, collector and base, said collector of said third transistor being connected to said base of said second transistor, said emitter of said third transistor being coupled to said other terminal of said DC motor and to one terminal of said DC power supply, and said base of said third transistor being connected to a common terminal to which said smoothing capacitor and said rectifying means are both connected.

4. A braking device as claimed in claim 3, further including a second resistor connected between said emitter of said third transistor and said smoothing capacitor, and a third resistor connected between said common terminal and said base of said first transistor.

5. A braking device as claimed in claim 1, wherein said speed detector means comprises means for detecting a counter electromotive force of said motor including a bridge circuit having at one branch said motor and at three other branches separate resistors, and control means for varying the base current of said second transistor depending on said counter electromotive force.

6. A braking device as claimed in claim 5, further including a third transistor having an emitter, collector and base, said collector of third transistor being connected to said base of said second transistor, said base of said third transistor being connected to said base of said first resistor and said emitter of said third transistor being connected to rectifying means, said rectifying means being connected across respective terminals of two of said separate resistors.

7. A braking device as claimed in claim 1, wherein the base of said first transistor is provided with means for amplifying the base current thereof.

8. A braking device as claimed in claim 1, wherein the collector of said first transistor is connected to the terminal of the motor through resistor means.

* * * * *